United States Patent
Arceneaux et al.

(10) Patent No.: US 12,428,931 B2
(45) Date of Patent: Sep. 30, 2025

(54) CEMENT TOP JOBS IN WELLBORE ANNULI USING EXPANDABLE COMPOSITIONS

(71) Applicant: Chevron U.S.A. Inc., San Ramon, CA (US)

(72) Inventors: Douglas Cory Arceneaux, Katy, TX (US); Benjamin James Krane, Houston, TX (US); Caleb Kimbrell Carroll, Houston, TX (US); Michael James Fuller, Cypress, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/531,656

(22) Filed: Dec. 6, 2023

(65) Prior Publication Data

US 2024/0191594 A1 Jun. 13, 2024

Related U.S. Application Data

(60) Provisional application No. 63/386,672, filed on Dec. 8, 2022.

(51) Int. Cl.
| | |
|---|---|
| *E21B 33/14* | (2006.01) |
| *C09K 8/42* | (2006.01) |
| *C09K 8/44* | (2006.01) |
| *C09K 8/46* | (2006.01) |
| *E21B 23/06* | (2006.01) |

(52) U.S. Cl.
CPC .......... *E21B 33/14* (2013.01); *C09K 8/428* (2013.01); *C09K 8/44* (2013.01); *C09K 8/46* (2013.01); *E21B 23/06* (2013.01)

(58) Field of Classification Search
CPC .......... E21B 33/14; C09K 8/428; C09K 8/46
USPC ........................................ 166/292
See application file for complete search history.

(56) References Cited

U.S. PATENT DOCUMENTS

| | | | |
|---|---|---|---|
| 2,867,278 A | 1/1959 | Mallory | |
| 3,637,019 A * | 1/1972 | Lee .................. | C09K 8/516 166/295 |
| 7,066,284 B2 * | 6/2006 | Wylie .............. | E21B 43/103 166/207 |
| 8,585,328 B2 * | 11/2013 | Smith .............. | E02D 5/18 405/266 |

(Continued)

OTHER PUBLICATIONS

Curtis, Bud, et al.; Innovative Kill And Salvage Operation Successfully Completed In Bay Of Bengal With No HSE Incidents; Soc. of Petroleum Engnrs.,SPE 128565; Jan. 20, 2010.

*Primary Examiner* — William D Hutton, Jr.
*Assistant Examiner* — Ashish K Varma
(74) *Attorney, Agent, or Firm* — King & Spalding LLP

(57) ABSTRACT

A method of deploying an expandable composition in a cement top job in a well system includes identifying evidence of actual or potential gas migration within an annulus cement of the well system. Once the evidence of gas migration is identified, a first component and a second component are mixed in a mixer to form the expandable composition and the expandable composition is pumped from the mixer through a conduit to a top of cement of the annulus cement. The expandable composition expands to form an expanded composition that seals the annulus above the top of cement of the annulus cement. Cement can be added onto the expanded composition.

11 Claims, 6 Drawing Sheets

(56) References Cited

U.S. PATENT DOCUMENTS

2014/0166285 A1* 6/2014 Santra .................... C09K 8/424
                                                                                 166/292

* cited by examiner

CEMENT TOP JOBS IN WELLBORE ANNULI USING EXPANDABLE COMPOSITIONS

RELATED APPLICATIONS

The present application claims priority to U.S. Provisional Patent Application No. 63/386,672 filed Dec. 8, 2022, the entire content of which is incorporated herein by reference.

The present application also is related to PCT Patent Application No. PCT/US2021/062540, filed Dec. 9, 2021, and titled "Deployment Methods For Expandable Polymer Grout For Plug And Abandonment Applications," the entire content of which is incorporated herein by reference.

TECHNICAL FIELD

The present application relates to methods and apparatus for deploying expandable compositions in wellbore annuli for top job treatments.

BACKGROUND

Oil and gas wells typically include cylindrical steel casings that line and support the well. A typical well often has multiple layers of overlapping casings as the well reaches the reservoir section depth; the multiple layers of casings can include a surface casing, a production casing within the surface casing, and in some instances intermediate casings. The annular spaces between overlapping layers of casings, and between the surface casing and the wall of the formation face, are filled with cement.

In some situations, wells at any stage of their productive life can demonstrate evidence of gas migration wherein gas leaks from the depths of the well system, up through pathways in the casing annuli and to the surface in which the well is located. Gas migration through pathways in the casing annuli is undesirable in that it can adversely affect the well and can result in sustained casing pressure within the annulus and at the top of the cement. The pathways from gas migration can result from poor cement integrity upon initial placement in the annulus, including insufficient cement height, as well as micro-annuli formation at a cement/casing annulus due to wellbore pressure changes, channeling due to inadequate wellbore fluid removal, cracks, cement shrinkage (if the cement has no access to additional water), cement dehydration due to fluid loss (if placed in the open hole), and delayed set due to contamination/dilution with wellbore fluids. The transition time of the cement from a liquid to a solid can also present challenges.

Remediation of gas migration can be costly and typically requires a cement top job wherein traditional cement is added to the top of the cement annulus, which area is referred to as the "top of cement". The cement top job increases the height of the cement within the casing annulus with the goal of sealing the pathways in the annular cement through which gas is migrating, thereby reducing the risk of sustained casing pressure from the migrating gas. Given the importance to the operation of the well of preventing gas migration through the cement annuli, improvements to cement top jobs would be desirable.

SUMMARY OF THE INVENTION

This summary is provided to introduce various concepts in a simplified form that are further described below in the detailed description. This summary is not intended to identify required or essential features of the claimed subject matter nor is the summary intended to limit the scope of the claimed subject matter.

Aspects of this disclosure are directed to systems and methods that may be useful for more effective cement top jobs in a hydrocarbon well. The systems and methods can be used to improve gas migration control in or adjacent to a hydrocarbon well. In particular, systems and methods for deploying an expandable composition at the top of cement are described herein.

In one aspect, a method of deploying an expandable composition in a cement top job in a well system can comprise: (a) identifying evidence of gas migration within an annulus cement located in an annulus of the well system; (b) mixing a first component and a second component to form the expandable composition; (c) pumping the expandable composition through a conduit to a top of cement of the annulus cement; and (d) allowing the expandable composition to form an expanded composition that seals the annulus above the top of cement of the annulus cement.

The foregoing deployment method of the preceding paragraph can include one or more of the following features. In one example of an expandable composition for a cement top job, the first component comprises an isocyanate and the second component comprises an organic polyol and wherein the expandable composition is a polyurethane. In another example, the first component comprises a slurry of sodium bentonite grains and the second component comprises an aqueous fluid. In yet another example, the first component comprises a superabsorbent polymer and the second component comprises an aqueous fluid. The foregoing method can further comprise the step of pumping a pre-flush fluid onto the top of cement of the annulus cement prior to pumping the expandable composition. The method can further comprise pumping cement on top of the expanded composition that seals the annulus above the top of cement of the annulus cement.

In another aspect, a method of deploying an expandable composition in a cement top job in a well system can comprise: (a) identifying evidence of gas migration within an annulus cement of the well system, and identifying a location of a top of cement; (b) forming a perforation in a casing above the top of cement; (c) combining a first component and a second component and applying mechanical mixing to the first component and the second component to form the expandable composition; (d) pumping the expandable composition downhole through a conduit and through the perforation in the casing to the top of cement of the annulus cement; and (e) allowing the expandable composition to form an expanded composition that seals the annulus above the top of cement of the annulus cement.

The foregoing deployment method of the preceding paragraph can include one or more of the following features. The method can further comprise pumping cement through the perforation in the casing and on top of the expanded composition that seals the annulus above the top of cement of the annulus cement. In one example, the first component comprises an isocyanate and the second component comprises an organic polyol and wherein the expandable composition is a polyurethane. In another example, the first component comprises a slurry of sodium bentonite grains and the second component comprises an aqueous fluid. In yet another example, the first component comprises a superabsorbent polymer and the second component comprises an aqueous fluid. The foregoing method can further comprise the step of pumping a pre-flush fluid onto the top of cement of the annulus cement prior to pumping the expandable composition.

In yet another aspect, a method of deploying an expandable composition in a cement top job in a well system can comprise: (a) identifying evidence of gas migration within an annulus cement of the well system and identifying a location of a top of cement; (b) forming a perforation in a casing below the top of cement; (c) combining a first component and a second component and applying mechanical mixing to the first component and the second component to form the expandable composition; (d) pumping the expandable composition through a conduit and through the perforation in the casing to a top of cement of the annulus cement; and (e) allowing the expandable composition to form an expanded composition that seals the annulus above the top of cement of the annulus cement.

The foregoing deployment method of the preceding paragraph can include one or more of the following features. The method can further comprise pumping cement on top of the expanded composition that seals the annulus above the top of cement of the annulus cement. In one example, the first component comprises an isocyanate and the second component comprises an organic polyol and wherein the expandable composition is a polyurethane. In another example, the first component comprises a slurry of sodium bentonite grains and the second component comprises an aqueous liquid. In yet another example, the first component comprises a superabsorbent polymer and the second component comprises an aqueous liquid. The foregoing method can further comprise the step of pumping a pre-flush fluid onto the top of cement of the annulus cement prior to pumping the expandable composition.

DEFINITIONS

Figure 1:
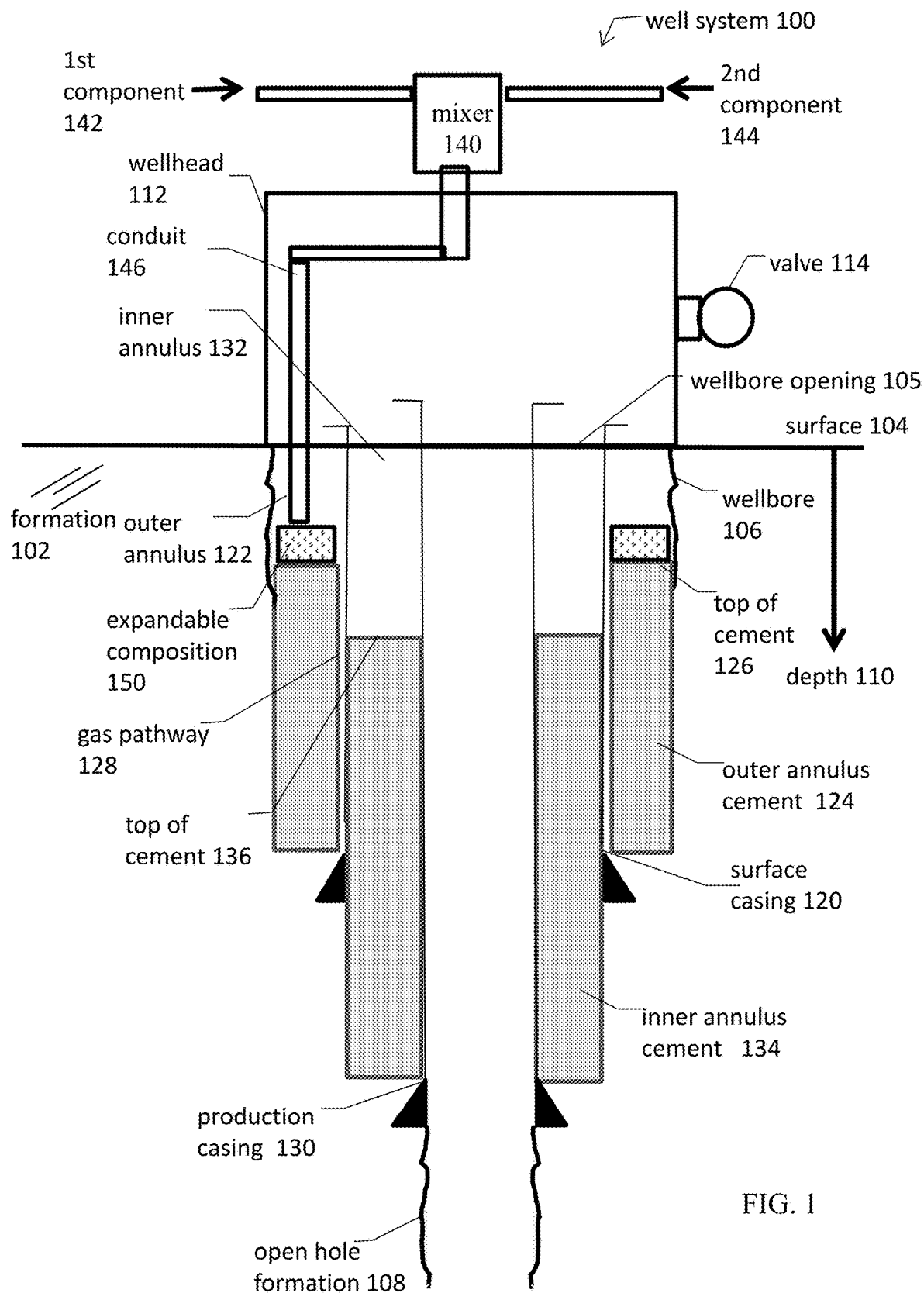
FIG. 1 illustrates a system and method of deploying an expandable composition in a cement top job in accordance with an example embodiment of the disclosure.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

The term "expandable composition" is used herein to refer to a combination of materials placed at a top of cement within an annulus in a wellbore to control gas migration. As non-limiting examples, the expandable composition can be: i) a polymer such as polyurethane (or grout), ii) zonite (which is a slurry containing sodium bentonite grains, or iii) a slurry of superabsorbent polymer (such as derivatives of polyacrylate).

The term "polyurethane", as used herein, is not limited to those polymers which include only urethane or polyurethane linkages. In certain embodiments, the polyurethane polymers may also include allophanate, carbodiimide, uretidinedione, and other linkages in addition to urethane linkages.

The term "top of cement", as used herein, refers to the top surface of cement located in a casing annulus of a wellbore.

The term "cement top job", as used herein, refers to the placing of a composition at a top of cement to control gas migration through the annulus within a wellbore.

The term "gas migration scenario", as used herein, refers to: (1) detected gas migration in a wellbore annulus, and (2) potential gas migration that may occur due to characteristics of the annulus cement or the top of cement in a wellbore.

As referred to herein, the term "coupled" can refer to two components that are in direct contact or directly attached to one another as well as two components that are joined or attached by a third component.

DESCRIPTION OF THE INVENTION

Expandable compositions and methods of deploying expandable compositions to top of cement locations within an annulus in a wellbore are disclosed herein. Such expandable compositions can be used to control gas migration through an annulus in a wellbore and can be used in connection with primary or secondary cementing operations as well as remedial cementing operations in the wellbore.

The following description provides three examples of expandable compositions that can be used in a cement top job in an annulus of a wellbore. The three examples are expandable polymer grout, a zonite slurry, and a superabsorbent polymer slurry, however, other types of expandable compositions also can be used in the cement top jobs described herein. The description of the expandable compositions is followed by a description of methods for deploying the expandable composition in a cement top job with reference to FIGS. 1-6.

Expandable Polymer Grout System

The first example of an expandable composition that can be used in a cement top job is an expandable polymer grout comprising a polyurethane. The polyurethane is formed from the reaction of an isocyanate component and an organic polyol component. In certain embodiments, the reaction of the isocyanate component and the organic polyol component proceeds by combining the components in the presence of a blowing agent and, optionally, a catalyst, at a temperature of at least about 15° C. or about 20° C. to form the expandable polymer grout. In certain embodiments, the reaction of the isocyanate component and the organic polyol component proceeds by combining the components in the presence of a blowing agent and, optionally, a catalyst, at a temperature in the range of about 15° C. to about 60° C., or about 20° C. to about 40° C.

In one embodiment, an expandable polymer grout system comprises the reaction product of: (i) an isocyanate component comprising one or more isocyanate compounds; and (ii) an organic polyol component comprising one or more organic polyol compounds; in the presence of (iii) one or more blowing agents. In certain embodiments, the expandable polymer grout system further comprises one or more auxiliary components, as described herein.

In certain embodiments, the expandable polymer grout comprises about 40 to about 60 percent by weight the isocyanate component and about 40 to about 60 percent by weight the organic polyol component.

In certain embodiments, the expandable polymer grout system can be deployed (e.g., injected) into or through the wellbore as a pre-mixed system of the isocyanate component and the organic polyol component, wherein at least one of the components is slow-reacting or has delayed activation. In such embodiments, the isocyanate component and organic polyol component can be mixed outside the wellbore, but proximate to the wellbore opening so that the mixture forming the expandable composition can be injected in liquid form into the wellbore and placed at the top of cement location shortly after mixing.

Due to the commonly rapid formation of the polyurethane product upon combining the isocyanate component and organic polyol component, it may be necessary to separate the components until they are placed at or near the top of cement location. In certain embodiments, the expandable polymer grout system can be deployed (e.g., injected) into or through the wellbore as a two-component system, wherein the isocyanate component and the organic polyol component are introduced into the wellbore separately and are mixed downhole proximate to the top of cement location.

In exemplary embodiments, the isocyanate component and the organic polyol component will be in liquid form, where the viscosity of the components may vary. In other embodiments, the isocyanate component and the organic polyol component may be blended with inert solvents to reduce the viscosities.

In certain embodiments, the expandable polymer grout system yields either rigid or flexible/elastomeric material. In certain embodiments, the expandable polymer grout system yields a low-permeability material suitable for superior gas-migration control after polymerization and curing. In certain embodiments, the expandable polymer grout system yields materials or plugs capable of chemical bonding to the formation, the casing/pipe, or both for improved gas migration control.

The expandable polymer grout system formulation, according to the embodiments, can be optimized in order to achieve various performance properties to ensure successful application through the exemplary methods. In particular, the systems and methods can be varied to optimize gas migration control, density, expansion percentage, curing time and water sensitivity.

In certain embodiments, the system may render an expanded and cured solid polymer that will seal the top of cement and all associated interfaces within the annulus against gas migration following placement. In certain embodiments, the seal is gas-tight. In certain embodiments, the cured expanded polymer grout system provides minimal shrinkage over years in the wellbore in order to maintain the gas-migration control over time.

Depending on the level of expansion (due to action of the blowing agents in the system), the resultant polymer grout system may vary significantly in the ultimate density (known as the free-rise density). Conversely, the hydrostatic pressure may inhibit some expansion of the grout leading to higher cured densities. In certain embodiments, the expandable polymer grout system described herein yields an expanded composition that ranges in free rise density from about 2 to about 62 lbm/ft$^3$. Optimization of the system can be carried out to find the best balance of annular gas migration control and sufficiently low permeability (through the porous expanded grout).

Differences in the expandable polymer grout system may lead to differences in the curing time. Practitioners in polyurethane chemistry often report several types of time for each system (from the "cream time" at which the solution color becomes turbid through the "rise time"); and differences in the system, specifically concentrations of blowing agent and catalysts, can lead to differences in curing time. In certain embodiments, the expandable polymer grout system is optimized with regards to curing times to ensure that the expansion and setting does not occur until the full volume of blended components are placed within the target location.

Depending on the components of the expandable polymer grout system, the system may have higher or lower sensitivity to water. In certain embodiments, the expandable polymer grout system is designed to minimize sensitivity to downhole water (whose presence could lead to higher expansion and lower final density).

In certain embodiments, the expandable polymer grout system, or method of injecting the system, is designed to minimize sensitivity to any fluids that may reside in the annular space or formation porosity prior to injection. In certain embodiments, the methods described herein involve the injection of either a fluid or gas pre-flush to displace near wellbore fluids deeper into the formation, up the annulus, or up the wellbore, prior to injection of the polyurethane precursor blend.

In certain embodiments, the volume of the reaction product (i.e., the volume of the expanded and cured polymer grout system) is about 2 to 13 times the initial combined volume of the components of the polymer grout system before reacting. In certain embodiments, the expandable polymeric grout system has a free rise density in the range of about 2 to about 62 lbm/ft³. In certain embodiments, the expandable polymeric grout system has a confined density in the range of about 15 to about 40 lbm/ft³.

Generally, the expanded composition formed from the expandable polymeric grout system undergoes gas migration failure only at very high pressures, if at all. In certain embodiments, the minimum gas migration failure pressure is at least about 500, about 1000, about 2000 or about 2500 psi. In certain embodiments, the expandable polyurethane grout system has a specific gravity after expansion in the range of about 0.05 to about 0.6, about 0.09 to about 0.53, about 0.09 to about 0.30, or about 0.09 to about 0.15.

Components of the expandable polymer grout system, including the isocyanate component, the polyol component, blowing agents, catalysts, and other auxiliary components will now be described in greater detail.

Isocyanate Component

According to the embodiments, the isocyanate component may comprise one or more types of isocyanate compounds. In certain embodiments, the isocyanate compound is a polyisocyanate having two or more functional groups, e.g., two or more NCO functional groups. According to one embodiment, the polyisocyanate includes those represented by the formula Q(NCO)$_n$ where n is a number from 2-5 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms.

Suitable isocyanates for purposes of the present invention include, but are not limited to, aliphatic and aromatic isocyanates. In certain embodiments, the isocyanate is selected from the group consisting of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), ethylene diisocyanate; 1,4-tetramethylene diisocyanate; 1,12-dodecane diisocyanate; cyclobutane-1,3-diisocyanate; cyclohexane-1,3- and -1,4-diisocyanate, and mixtures of these isomers; 2,4- and 2,6-hexahydrotoluene diisocyanate and mixtures of these isomers; dicyclohexyl-methane-4,4'-diisocyanate 1,3- and 1,4-phenylene diisocyanate; naphthylene-1,5-diisocyanate; triphenylmethane-4,4', 4"-triisocyanate; polyphenyl-polymethylene-polyisocyanates of the type which may be obtained by condensing aniline with formaldehyde, followed by phosgenation (polymeric MDI); norbornane diisocyanates; m- and p-isocyanatophenyl sulfonylisocyanates; perchlorinated aryl polyisocyanates; modified polyfunctional isocyanates containing carbodiimide groups, urethane groups, allophonate groups, isocyanurate groups, urea groups, or biruret groups; polyfunctional isocyanates obtained by telomerization reactions; polyfunctional isocyanates containing ester groups; and polyfunctional isocyanates containing polymeric fatty acid groups; and combinations thereof.

Suitable isocyanates for use in the expandable polymer grouts described herein include but are not limited to: toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable rigid polyurethane foams can also be prepared from aromatic diisocyanates or isocyanates having one or two aryl, alkyl, arakyl or alkoxy substituents wherein at least one of these substituents has at least two carbon atoms.

In certain embodiments, the isocyanate has an NCO content of from about 25 to about 33 weight percent; a nominal functionality of from about 2 to about 3.5; and a viscosity of from about 60 to about 2000 cps, or about 200 to about 700 cps, at 25° C. (77° F.).

In certain embodiments, the isocyanate components comprise polymeric diphenylmethane diisocyanate.

In certain embodiments, the isocyanate component may be an isocyanate prepolymer. An isocyanate prepolymer comprises a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Suitable non-limiting examples of aminoalcohols include ethanolamine, diethanolamine, triethanolamine, and combinations thereof.

In certain embodiments, the isocyanate compounds may also be provided in a chemically "blocked" state, whereby a reaction to "deblock" the isocyanate may happen prior to polymerization, optionally under downhole conditions, to expose the active isocyanate functionalities. The exposed isocyanates will then react with the organic alcohol groups of the polyol to form the urethane bonds. As such, blocked isocyanate compounds can be used to prevent premature reaction of the isocyanate component with the organic polyol component. Blocked isocyanates regenerate the isocyanate function through heating. Typical unblock temperatures range between 65 to 200° C., depending on the isocyanate structure and blocking agent.

In certain embodiments, the isocyanate component comprises blocked isocyanate compounds, or an isocyanate compound that has been protected with a blocking agent.

Suitable isocyanate blocking agents may include alcohols (including phenols), ethers, phenols, malonate esters, methylenes, aceto acetate esters, lactams, oximes, ureas, bisulphites, mercaptans, triazoles, pyrazoles, secondary amines, glycolic acid esters, acid amides, aromatic amines, imides, diaryl compounds, imidazoles, carbamic acid esters, or sulfites.

Exemplary phenolic blocking agents include phenol, cresol, xylenol, chlorophenol, ethylphenol and the like.

Lactam blocking agents include gamma-pyrrolidone, laurinlactam, epsilon-caprolactam, delta-valerolactam, gamma-butyrolactam, beta-propiolactam and the like.

Methylene blocking agents include acetoacetic ester, ethyl acetoacetate, acetyl acetone and the like.

Oxime blocking agents include formamidoxime, acetaldoxime, acetoxime, methyl ethylketoxine, diacetylmonoxime, cyclohexanoxime and the like.

Mercaptan blocking agent include butyl mercaptan, hexyl mercaptan, t-butyl mercaptan, thiophenol, methylthiophenol, ethylthiophenol and the like.

Acid amide blocking agents include acetic acid amide, benzamide and the like. Imide blocking agents include succinimide, maleimide and the like.

Amine blocking agents include xylidine, aniline, butylamine, dibutylamine diisopropyl amine and benzyl-tert-butyl amine and the like.

Imidazole blocking agents include imidazole, 2-ethylimidazole and the like.

Imine blocking agents include ethyleneimine, propyleneiniine and the like.

Triazole blocking agents include 1,2,4-triazole, 1,2,3-benzotriazole, 1,2,3-tolyl triazole and 4,5-diphenyl-1,2,3-triazole.

Alcohol blocking agents include methanol, ethanol, propanol, butanol, amyl alcohol, ethylene glycol monomethyl ether, ethylene glycol monoethyl ether, ethylene glycol monobutyl ether, diethylene glycol monomethyl ether, propylene glycol monomethyl ether, benzyl alcohol, methyl glycolate, butyl glycolate, diacetone alcohol, methyl lactate, ethyl lactate and the like. Additionally, any suitable aliphatic, cycloaliphatic or aromatic alkyl monoalcohol may be used as a blocking agent in accordance with the present disclosure. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be used. Suitable cycloaliphatic alcohols include, for example, cyclopentanol, cyclohexanol and the like, while aromatic-alkyl alcohols include phenyl carbinol, methylphenylcarbinol, and the like.

Dicarbonylmethane blocking agents include malonic acid esters such as diethyl malonate, dimethyl malonate, di(iso)propyl malonate, di(iso)butyl malonate, di(iso)pentyl malonate, di(iso)hexyl malonate, di(iso)heptyl malonate, di(iso)octyl malonate, di(iso)nonyl malonate, di(iso)decyl malonate, alkoxyalkyl malonates, benzylmethyl malonate, di-tert-butyl malonate, ethyl-tert-butyl malonate, dibenzyl malonate; and acetylacetates such as methyl acetoacetate, ethyl acetoacetate, propyl acetoacetate, butyl acetoacetate and alkoxyalkyl acetoacetates; cyanacetates such as cyanacetic acid ethylester; acetylacetone; 2,2-dimethyl-1,3-dioxane-4,6-dione; methyl trimethylsilyl malonate, ethyl trimethylsilyl malonate, and bis(trimethylsilyl) malonate. Malonic or alkylmalonic acid esters derived from linear aliphatic, cycloaliphatic, and/or arylalkyl aliphatic alcohols may also be used. Such esters may be made by alcoholysis using any of the above-mentioned alcohols or any monoalcohol with any of the commercially available esters (e.g., diethylmalonate). For example, diethyl malonate may be reacted with 2-ethylhexanol to obtain the bis-(2-ethylhexyl)-malonate. It is also possible to use mixtures of alcohols to obtain the corresponding mixed malonic or alkylmalonic acid esters. Suitable alkylmalonic acid esters include: butyl malonic acid diethylester, diethyl ethyl malonate, diethyl butyl malonate, diethyl isopropyl malonate, diethyl phenyl malonate, diethyl n-propyl malonate, diethyl isopropyl malonate, dimethyl allyl malonate, diethyl chloromalonate, and dimethyl chloromalonate.

Other isocyanate blocking agents are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is incorporated herein by reference. Mixtures of the above-listed isocyanate blocking agents may also be used.

Blocked polyisocyanate compounds may include, for example, polyisocyanates having at least two tree isocyanate groups per molecule, where the isocyanate groups are blocked with an above-described isocyanate blocking agent.

Blocked isocyanates may be prepared by reaction of one of the above-mentioned isocyanate compounds and a blocking agent by a conventionally known appropriate method.

In other embodiments, the blocked isocyanates used in embodiments disclosed herein may be any isocyanate where the isocyanate groups have been reacted with an isocyanate blocking agent so that the resultant capped isocyanate is stable to active hydrogens at room temperature but reactive with active hydrogens at elevated temperatures, such as between about 65° C. to 200° C.

Blocked polyisocyanate compounds are typically stable at room temperature. When heated to a temperature about the minimum unblocking temperature, the blocking agent is dissociated to regenerate the free isocyanate groups, which may readily react with hydroxyl groups of the organic polyol compounds.

As an alternative to an external or conventional blocking agent, the isocyanates of the present disclosure may be internally blocked. The term internally blocked, as used herein, indicates that there are uretdione groups present which unblock at certain temperatures to free the isocyanate groups for cross-linking purposes. Isocyanate dimers (also referred to as uretdiones) may be obtained by dimerizing diisocyanates in the presence of phosphine catalysts. In certain embodiments, the blocking agent is selected from the group consisting of: methylethylcetoxime (MEKO), diethyl malonate (DEM), 3,5-dimethylpyrazole (DMP).

Organic Polyol Component

According to the embodiments, the organic polyol component of the expandable polymer grout system may comprise one or more types of organic polyol compounds, which are reactive with the isocyanate compounds. Organic polyol compounds suitable for use in the present invention may include, but are not limited to, polyether polyols, polyester polyols, polycarbonate polyols, and biorenewable polyols. Such polyols may be used alone or in suitable combination as a mixture.

General functionality of polyols used in the present invention is between about 2 to about 5, or about 2 to about 3. The weight average molecular weight of polyols may be between about 500 and about 10,000, or about 500 and about 5,000 g/mol.

The proportion of the organic polyol compounds is generally of between about 10 and about 80% by weight, preferably between about 20 and about 50% based of the expandable polymer grout system.

Polyether polyols for use in the present invention include alkylene oxide polyether polyols such as ethylene oxide polyether polyols and propylene oxide polyether polyols and copolymers of ethylene and propylene oxide with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

Polyester polyols for use in the present invention include, but are not limited to, those produced by reacting a dicarboxylic acid with an excess of a diol, for example, adipic acid with ethylene glycol or butanediol, or reaction of a lactone with an excess of a diol such as caprolactone with propylene glycol. In addition, polyester polyols for use in the present invention may also include: linear or lightly branched aliphatic (e.g. adipates) polyols with terminal hydroxyl group; low molecular weight aromatic polyesters; polycaprolactones; polycarbonate polyol. Those linear or lightly branched aliphatic (e.g. adipates) polyols with terminal hydroxyl group are produced by reacting a dicarboxyl acids with an excess of diols, triols and their mixture; those dicarboxyl acids include, but are not limited to, for example, adipic acid, AGS mixed acid; those diols, triols include, but are not limited to, for example, ethylene glycol, diethylene glycol, propylene glycol, dipropylene glycol, 1,4-butane diol, 1,6-hexane diol, glycerol, trimethylolpropane and pentaerythritol.

In certain embodiments, the organic polyol component is selected from aromatic polyester polyol and an aliphatic polyester polyol.

The aromatic polyester polyol is typically formed via the condensation of a glycol and a dicarboxylic acid or acid derivative. The functionality, structure, and molecular weight of the polyester polyol can be varied to tailor the processing characteristics and physical properties of the expanded polymer grout system to a particular application. In certain embodiments, the aromatic polyester polyol has a functionality of greater than 2 or about 2 to about 5 and a weight-average molecular weight of from 500 to 5,000 g/mol, or about 1,000 to 3,000 g/mol. In certain embodiments, the aromatic polyester polyol has a hydroxyl value of from 100 to 500 mg KOH/g. In certain embodiments, the aromatic polyester polyol has a viscosity at 25° C. of from about 5,000 to about 20,000 cps, or about 9,000 to about 14,000 cps. In certain embodiments, the aromatic polyester polyol has a specific gravity of about 1.0 to about 1.2 g/cm$^3$. In certain embodiments, the aromatic polyester polyol is present in the organic polyol component in an amount of from about 25 to about 100 parts by weight, based on 100 parts by weight of the total weight of the polyols present in the organic polyol component.

The aliphatic polyester polyol is typically formed via the condensation of a glycol and a dicarboxylic acid or acid derivative. In certain embodiments, the aliphatic polyester polyol has a functionality of greater than 2 or about 2 to about 5 and a weight-average molecular weight of from 500 to 5,000 g/mol, or about 1,000 to 3,000 g/mol. In certain embodiments, the aliphatic polyester polyol has a hydroxyl value of from 20 to 400 mg KOH/g. In certain embodiments, the aliphatic polyester polyol has a viscosity at 25° C. of from about 10,000 to about 20,000 cps, or about 15,000 to about 19,000 cps. In certain embodiments, the aliphatic polyester polyol has a specific gravity of about 1.0 to about 1.2 g/cm$^3$. In certain embodiments, the aliphatic polyester polyol is present in the organic polyol component in an amount of from about 2 to about 100 parts by weight, based on 100 parts by weight of the total weight of the polyols present in the organic polyol component.

In certain embodiments, one or more aliphatic polyester polyol and one or more aromatic polyester polyol are both present in in the organic polyol component, for example in a ratio of from 1:5 to 1:15.

Polycarbonate polyols are derived from carbonic acid that can be produced through the polycondensation of diols with phosgene, although transesterification of diols, commonly hexane diol, with a carbonic acid ester, such as diphenylcarbonate.

Biorenewable polyols suitable for use in the present invention include castor oil, sunflower oil, palm kernel oil, palm oil, canola oil, rapeseed oil, soybean oil, corn oil, peanut oil, olive oil, algae oil, and mixtures thereof.

Blowing Agents, Catalysts and Other Auxiliary Components

Typically, the isocyanate component and the organic polyol component are reacted in the presence of a blowing agent to form the expandable polymer grout. The blowing agent may be a physical blowing agent, a chemical blowing agent, or a combination of a physical blowing agent and a chemical blowing agent.

The term "physical blowing agent" refers to blowing agents that do not chemically react with the isocyanate and/or the organic polyol component. The physical blowing agent can be a gas or liquid. The liquid physical blowing agent typically evaporates into a gas when heated, and typically returns to a liquid when cooled. Examples of physical blowing agents include volatile liquids such as chlorofluorocarbons, partially halogenated hydrocarbons or non-halogenated hydrocarbons like propane, n-butane, isobutane, n-pentane, isopentane cyclopentane and/or neopentane. In a particular embodiment, the blowing agent comprises, or consists essentially of, cyclopentane.

The term "chemical blowing agent" describes blowing agents which chemically react with the isocyanate or with other components to release a gas for foaming. Examples of chemical blowing agents include water, gaseous compounds such as nitrogen or carbon dioxide, gas (e.g., $CO_2$) forming compounds such as azodicarbonamides, carbonates, bicarbonates, citrates, nitrates, borohydrides, carbides such as alkaline earth and alkali metal carbonates and bicarbonates (e.g., sodium bicarbonate and sodium carbonate, ammonium carbonate, diaminodiphenylsulphone, hydrazides, malonic acid, citric acid, sodium monocitrate, ureas, azodicarbonic methyl ester, diazabicylooctane and acid/carbonate mixtures). In a particular embodiment, the blowing agent comprises, or consists essentially of, water.

In certain embodiments, the total amount of the blowing agents present in the reaction mixture or in the organic polyol component in an amount of from about 1 to about 30, or about 10 to about 25, parts by weight, based on 100 parts by weight of the organic polyols present in the organic polyol component.

In one embodiment, the expandable polymer grout system comprises a physical blowing agent. In one embodiment, the expandable polymer grout system comprises a chemical blowing agent. In one embodiment, the expandable polymer grout system comprises both a physical blowing agent and a chemical blowing agent.

In one embodiment, the expandable polymer grout system comprises one or more catalysts. In certain embodiments, the one or more catalysts are present in the organic polyol component to catalyze the reaction between the isocyanate and the polyols. The catalyst may include any suitable catalyst or mixtures of catalysts known in the art. Examples of suitable catalysts include, but are not limited to, gelation catalysts, e.g., amine catalysts in dipropylene glycol; blowing catalysts, e.g., bis(dimethylaminoethyl)ether in dipropylene glycol; and metal catalysts, e.g., tin, bismuth, lead, etc. One non-limiting example of a suitable catalyst is N,N-dimethylcyclohexylamine.

In one embodiment, the expandable polymer grout system comprises one or more surfactants. The surfactant typically supports homogenization of the blowing agent and the polyol and regulates a cell structure of the expandable polymer grout. In certain embodiments, the one or more surfactants are present in the organic polyol component. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. One specific, non-limiting example of a surfactant is a silicone-polyether block copolymer.

The expandable polymer grout system, or organic polyol component, may optionally include one or more additional auxiliary components. Suitable additives for purposes of the instant disclosure include, but are not limited to, chain-extenders, crosslinkers, chain-terminators, processing additives, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, plasticizers, silane coupling agent, cell stabilizers, fillers, or any combination thereof.

In one embodiment, the proportion of the auxiliary components present in the expandable grout composition is of between about 5 and about 80 percent by weight, or about 10 and about 60 percent by weight, the total weight of the expandable polymer grout system.

In certain embodiments, the two component systems have the isocyanate delivered as an isolated component (not combined with other reactants or additives) and the organic polyol component may be pre-blended with blowing agents, catalysts and other auxiliary components, as described above.

In certain embodiments, the performance properties of the expandable polymer grout system may be adjusted through the addition of the blowing agents, catalysts and auxiliary components.

In certain embodiments, it may be desirable to combine or mix the expandable polymer grout system with other functional materials, such as fluid-loss control particulates to mitigate premature or excessive loss of the liquid polymer into the formation or annulus prior to the polymer setting up or crosslinking in the desired top of cement locations. In certain embodiments, the expandable polymer grout system may be combined with cement such as to enhance certain properties of the cement. Combinations with materials such as cement may provide enhanced material properties for operations such as forming an improved seal at a top of cement location. Prior to the polymer crosslinking or otherwise reacting, the disclosed polymers may exhibit flow properties that are more Newtonian and less viscous than liquid cement, thereby flowing into tighter flowpaths than cement alone otherwise might.

Expandable Zonite Composition

Another example of an expandable composition that can be used in a cement top job is zonite, which is a slurry of sodium bentonite grains. Optionally, the zonite can include polyvinyl pyrollidone ("PVP"). Zonite can expand up to 30 times its original volume when exposed to water. Zonite also has a lower permeability than cement and the plasticity of the material allows it to conform to the formation geometry. The hydration of zonite is most effective in hot, fresh water but still hydrates in saline, oily, and sour fluids. However, it does take a significant amount of time to seal with 2-3 months on average. The following embodiments can be pumped into the well, or it can be dropped into the well as nodules are cylinders.

In one example embodiment, the zonite can be deployed to the top of cement location while suspended in a hydrocarbon solvent. Once in position at or proximate to the top of cement, the suspension can be exposed to an aqueous flush causing the zonite to expand and form an expanded composition that inhibits gas migration through the annulus above the top of cement.

In another example embodiment, the zonite can be deployed to the top of cement location while suspended in an oil-external emulsion. Once in position at or proximate to the top of cement, the emulsion is broken and the zonite is exposed to an aqueous flush causing the zonite to expand and form an expanded composition that seals the annulus and inhibits gas migration through the annulus above the top of cement.

In yet another example embodiment, the zonite composition may have a slow expansion such that it can be mixed into an aqueous carrier fluid proximate to the wellbore opening and then deployed to the top of cement location where the zonite will continue to expand and form an expanded composition that seals the annulus inhibits gas migration through the annulus above the top of cement.

Expandable Superabsorbent Polymer Composition

Another example of an expandable composition that can be used in a cement top job is a slurry containing a superabsorbent polymer. Examples of such superabsorbent polymers include derivatives of polyacrylate, such as sodium salt of polyacrylic acid. Superabsorbent polymers are known to absorb up to 300 times their weight in water.

As one example embodiment, a suspension of a superabsorbent polymer in a non-aqueous slurry can be placed at a top of cement location in an annulus within a wellbore and exposed to an aqueous liquid. The superabsorbent polymer can expand into an expanded composition that seals the annulus and inhibits gas migration up through the annulus above the top of cement.

Methods of Deploying Expandable Compositions for Cement Top Jobs

The expandable composition according to the example embodiments described herein may be deployed or injected to an annulus within the wellbore for controlling gas migration at a top of cement. The annulus may have gas pathways resulting from broken or poor quality cement, natural fractures, pores (formation porosity), micro-annuli (e.g., between the casing and the annulus), gaps or breaks in a casing or a casing collar, fractures in cement in an annulus, gaps between cement in an annulus and the formation rock, or other gas pathways and combinations thereof. The methods of deployment downhole will depend on the characteristics (e.g., viscosity and reactivity) of the expandable composition and the components that form the expandable composition, as well as characteristics and conditions of the wellbore. As will be illustrated by the examples described below, the expandable composition may be deployed through the wellbore and through perforations into the annulus, the expandable composition may be injected into the annulus between two casing strings or into the annulus between a casing and formation, or the expandable compositions may be deployed using combinations of the foregoing for optimizing sealing of the annulus above the top of cement.

The expandable composition or components thereof can be delivered to the top of cement location using any of a variety of conduits, including coiled tubing, coiled hose(s), custom umbilical, concentric coaxial tubing, isolated tubes, dual-string injection, or other conduit to target the placement of the expandable composition.

Methods of injection to form an annular seal according to the embodiments, may involve injection of the expandable composition through existing perforations, reperforations, section-milled windows, cutting slots, or other means of annular access with customized geometry. In certain embodiments, methods of injection to form the seal according to the embodiments may involve injection into an area where the casing has been cut and pulled out of the well.

In certain embodiments, the first component and the second component of the expandable composition are injected through a form of dual-string injection, where each component is injected through an isolated tube, are combined optionally in a mixing chamber placed at the target interval (optionally between packers), and the combined precursors are then injected from the mixing chamber into the annular space. This injection will be followed by a static curing time, to allow the expandable composition to first expand and then to cure into a fully hardened state. The curing may optionally be carried out under additional pressure applied through both the workstring and/or the annulus (possibly to control the degree of expansion and/or density or to further squeeze the precursor blend into the annulus). Injection of the precursors through the mixing chamber may optionally be followed by a flush stage of an inert fluid or gas (that does not participate in the polymerization/curing process) prior to expansion and curing. The volume of this flush stage should be just sufficient to purge and clean the mixing chamber.

In certain embodiments, the first component and the second component of the expandable composition are injected into the well or wellbore separately.

In certain embodiments, the components of the expandable composition are combined by mechanical mixing or in a mixing chamber prior to injection of the mixture into the region in which a seal is to be formed.

In certain embodiments, the initial combining of the components may be conducted at the surface (or seafloor in the case of an offshore well), prior to being pumped into the wellbore, while in other embodiments the components will be combined inside the wellbore. In certain embodiments, the target location is at a location within the wellbore, in the perforations, in a casing annulus and/or formation surrounding the wellbore. In certain embodiments, the target location is at a location accessed through the wellbore.

In certain embodiments, the method comprises creating a seal in the wellbore annulus during at least one of a drilling operation, a casing operation, a liner operation, a completion operation, a recompletion operation, a primary cementing operation, and a staged cementing operation.

Other implementations may further comprise hydraulically squeezing the expandable composition into the wellbore annulus, while flowable, prior to curing or hardening.

In certain embodiments, the method comprises blending (or combining) the components of the expandable polymer grout system prior to pumping the combination downhole or blending (or combining) the components at one location downhole and then pumping the blended components to the target location or another target location downhole. The target location may include a location within the wellbore that at least partially comprises an annular region within the wellbore.

In certain embodiments, the method comprises the expandable composition being subjected to elevated pressure (e.g., downhole) while it is undergoing reaction and forming a plug. In certain embodiments, the applied pressure or hydrostatic pressure is the range of about 500 to about 5,000 psi. In certain embodiments, the application of pressure during the curing of the polymer plug decreases the permeability of the plug compared to when the plug undergoes curing at atmospheric pressure. For example, the addition of top pressures of 100 and 250 psi during curing may lead to an improvement in gas migration control compared to the initial result without applied pressure, but may concurrently alter the expanded density versus ambient expansion.

Deployment Examples

Example 1

Figure 2:
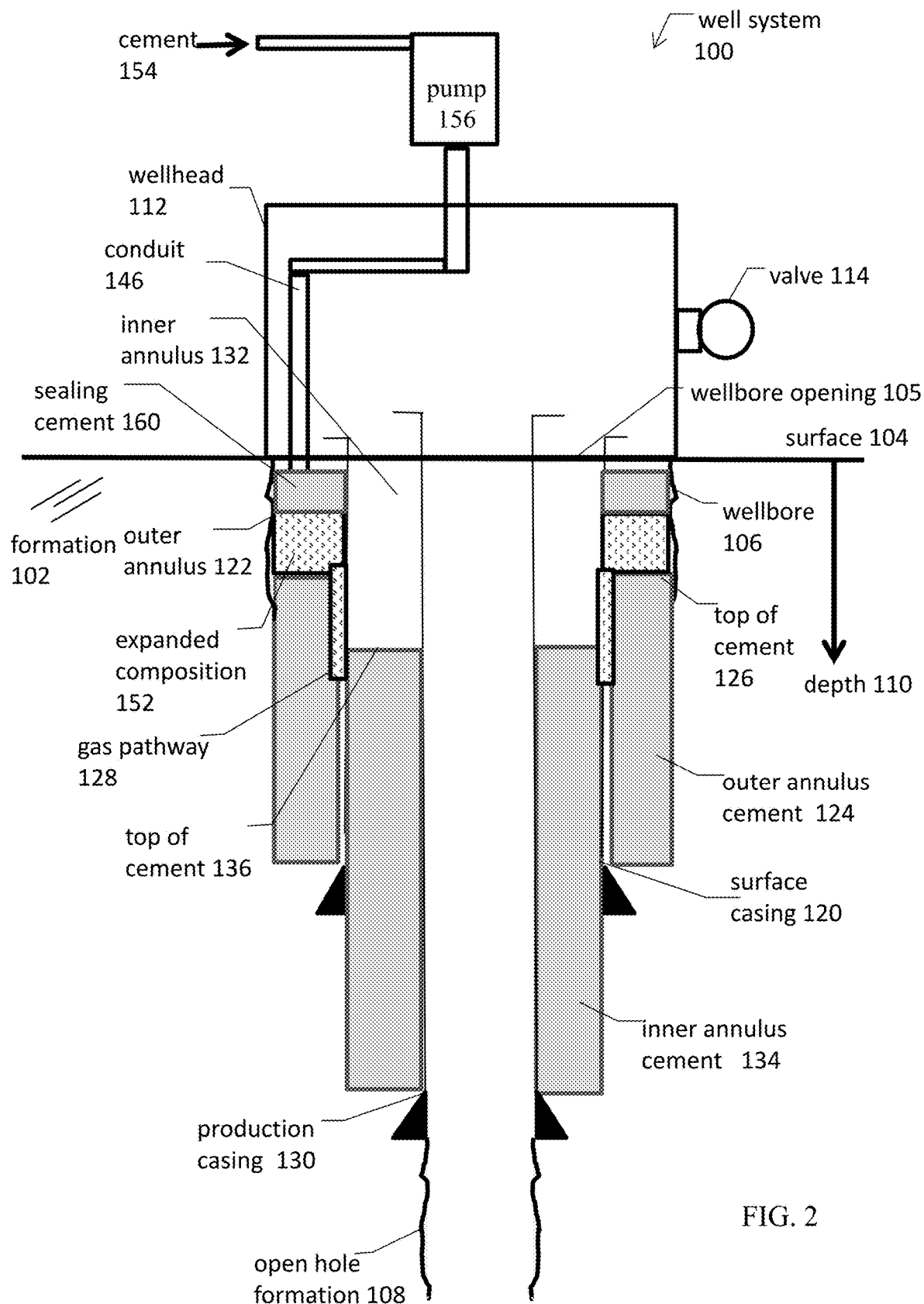
FIG. 2 illustrates a subsequent step of the system and method of FIG. 1 for deploying an expandable composition in a cement top job in accordance with an example embodiment of the disclosure.

Referring to FIGS. 1 and 2, a first example of deploying an expandable composition in a cement top job is illustrated. FIG. 1 illustrates a first step of the deployment process wherein an expandable composition, such as the previously described example expandable compositions, is deployed at a top of cement location within a wellbore. FIG. 2 illustrates a subsequent step of the deployment process after the expandable composition has expanded and formed an expanded composition. The elements illustrated in FIGS. 1 and 2 are not necessarily all drawn to scale and some standard components commonly found in a well system have been omitted in order to more clearly illustrate the novel aspects of this disclosure.

FIGS. 1 and 2 illustrate a cross-section of an example well system 100, which includes a wellbore 106 that has been drilled into a surface 104 and a formation 102. Well system 100 can be either an onshore or an offshore well. The wellbore 106 includes a wellbore opening 105 in the surface 104 and the wellbore extends a depth 110 into the formation 102 as measured from the surface 104. The wellbore 106 is supported by a surface casing 120, which extends into the wellbore 106 from the wellhead 112 to a first depth, and a production casing 130, which extends into the wellbore 106 from the wellhead 112 to a second depth that is deeper than the first depth. The surface casing 120 and production casing 130 are cylindrical steel tubulars that support the walls of the wellbore as is known by those in the field. Only the two casings are illustrated in FIGS. 1 and 2 for simplicity, but in other embodiments, other casings, such as intermediate casings, may be present in the wellbore 106. The region below the production casing 130 is the open hole formation 108 where the walls of the wellbore 106 are exposed.

Given the cylindrical shape of the wellbore 106 and the casings, annular volumes are formed in the wellbore 106. Specifically, the wall of the wellbore 106 and the outer surface of the surface casing 120 form an outer annulus 122 and the inner surface of the surface casing 120 and the outer surface of the production casing 130 form an inner annulus 132. In connection with the drilling of the well, the outer annulus 122 is filled with an outer annulus cement 124 and the inner annulus 132 is filled with an inner annulus cement 134. The top surface of the outer annulus cement 124 is referred to as the top of cement 126 and the top surface of the inner annulus cement is similarly referred to as the top of cement 136.

As described previously, gas pathways may form in the annulus cement of a wellbore due to pressure changes in the well over time, dehydration of the cement, cement shrinkage, the presence of other fluids, and various environmental challenges in the well when deploying the annulus cement. FIGS. 1 and 2 illustrate an example gas pathway 128 that has formed in the outer annulus 122 and between the outer surface of the surface casing 120 and the inner surface of the outer annulus cement 124. The gas pathway 128 may extend around the entire circumference of the annulus or only a portion of the annulus. Gas pathways such as gas pathway 128 are undesirable because gases from the deeper portions of the well system can migrate upward through the gas pathway thereby creating pressure within the annulus and interfering with the production of resources from the well.

Pressure resulting from gas migration upward through the annulus can be detected at a valve 114 attached to the wellhead 112 and is one example of evidence of gas migration. A cement top job can be performed when gas migration is detected at the valve 114. Alternatively, evidence of gas migration can include preventative situations where a cement top job is performed before an actual casing pressure due to gas migration is detected, but where the integrity of the annulus cement is in question. A variety of verification methods can be used to assess the integrity of the annulus cement and particularly the integrity and location of the top of cement of the annulus cement. Examples of top of cement verification methods include: (1) visual inspection of the top of cement, (2) pressure matching using parameters measured during the cementing job, (3) lift pressure determined from calculated hydrostatic pressure and the measured end pressure at completion of the cementing job, (4) volume matching that compares the volume pumped into the wellbore and the volume pumped out, (5) ultra-sonic evaluation of the bond between the cement and the surface of the casing, (6) temperature measurements taken during the hydration of the cement, (7) a cement bond log and variable density log, (8) a fluid tracer in the cement slurry, and (9) using an acoustic logging tool. The particular verification methods selected can depend upon whether the well experiences losses.

When evidence of gas migration (actual or potential gas migration) through a gas pathway is identified, a cement top job can be performed to seal the gas pathway in order to control the gas migration from the deeper portions of the well up through the annulus. The cement top job illustrated in FIGS. 1 and 2 involves deploying an expandable composition 150 at the top of cement 126 wherein an actual or potential gas migration is identified. In the example of FIGS. 1 and 2, the expandable composition 150 is deployed around the entire circumference of the outer annulus 122 and thus the expandable composition can be seen on both sides of the outer annulus 122 in the cross-sectional view of FIGS. 1 and 2. Alternatively, the expandable composition can be deployed in a more targeted manner in which it is placed in only a portion of the annulus.

As described in the previous examples of expandable compositions, the expandable composition typically comprises a first component and a second component that are combined to become the expandable composition and such expandable composition will then react and expand to become an expanded composition. The first component can be the isocyanate and the second component can be the organic polyol. Alternatively, the first component can be the slurry of sodium bentonite grains and the second component can be an aqueous liquid. In yet another alternative, the first component can be a superabsorbent polymer and the second component can be an aqueous liquid. As also described in the previous examples, the two components will typically be combined in proximity to the target top of cement location so that they can be deployed before forming into a cured or hardened state of the expanded composition. The two components can be combined within the wellbore or, as illustrated in FIGS. 1 and 2, they can be combined outside the wellbore but in proximity to the wellbore opening 105.

As illustrated in FIGS. 1 and 2, the first component 142 flows through a conduit to a mixer 140 and the second component 144 flows through another conduit to the mixer 140. Although not shown in FIG. 1, pumps can be used to drive the first component 142 and the second component 144 to the mixer and down into the wellbore. The two components are combined in the mixer to form the expandable composition 150. The expandable composition flows from the mixer 140 through conduit 146 and into the outer annulus 122 where it flows around the outer annulus 122 as shown in FIG. 1. As illustrated in FIG. 1, the expandable composition 150 is placed at the top of cement 126 of the outer annulus cement 124 where it is allowed to expand. The location of the top of cement 126 can be identified using one of the previously described methods so that the end of conduit 146 can be properly positioned for spotting the expandable composition 150. As the expandable composition 150 is placed within the annulus above the top of cement 126, it may displace other fluids that are present within the annulus.

FIG. 2 illustrates well system 100 after the expandable composition 150 has expanded and become the expanded composition 152 extending along the circumference of the outer annulus 122. As illustrated in FIG. 2, the expanded composition 152 has expanded upward within the outer annulus 122 and downward into the gas pathway 128. Accordingly, the expanded composition 152 can provide a barrier that effectively controls gas migration through the gas pathway 128 in the outer annulus 122. The volume of the expandable composition 150 that is placed in the annulus can be controlled so that after it expands to form the expanded composition 152, space remains in the outer annulus 122 between the top surface of the expanded composition 152 and the wellbore opening 105. Planning for this remaining space in the outer annulus 122 allows for the option to deploy a sealing cement 160 (alternatively referred to a secondary cement) on top of the expanded composition 152. As illustrated in FIG. 2, cement 154 can be pumped by a pump 156 through conduit 146 so that a layer of sealing cement 160 flows around the outer annulus 122 and is deployed on top of the expanded composition 152. While not required, the sealing cement 160 can further assist with gas migration control.

While particular arrangements of conduits and a mixer are illustrated in the example of FIGS. 1 and 2, and in the examples of FIGS. 3 through 6 that follow, it should be understood that these examples are illustrative. In other embodiments, components of the expandable composition can be combined and conveyed using a variety of equipment and arrangements. Similarly, while the example of FIGS. 1 and 2 describes a cement top job in an outer annulus above an outer annulus cement, similar techniques can be applied within other types of annuli and above other annuli cement encountered in a well.

Example 2

Figure 3:
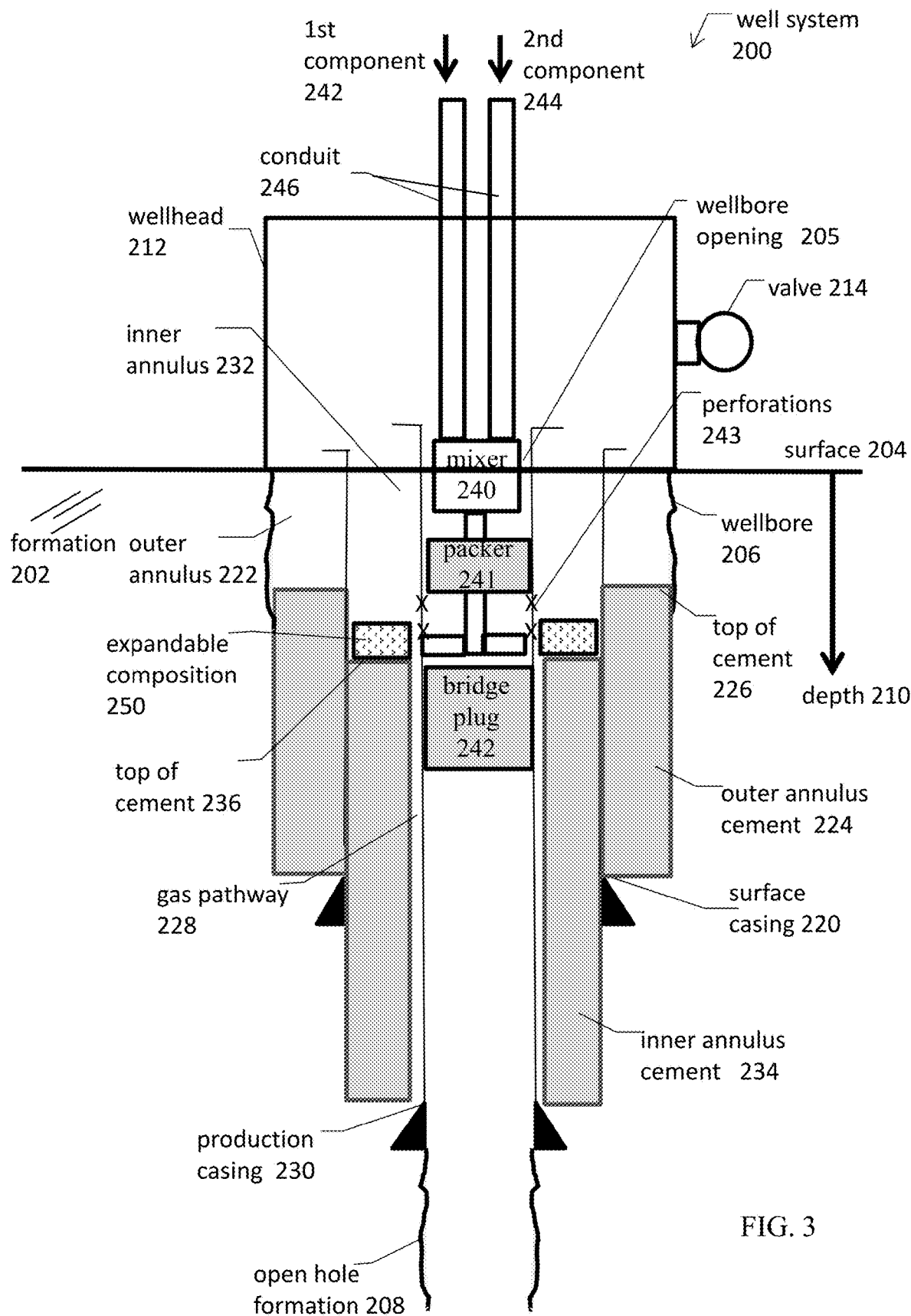
FIG. 3 illustrates another system and method of deploying an expandable composition in a cement top job in accordance with an example embodiment of the disclosure.
Figure 4:
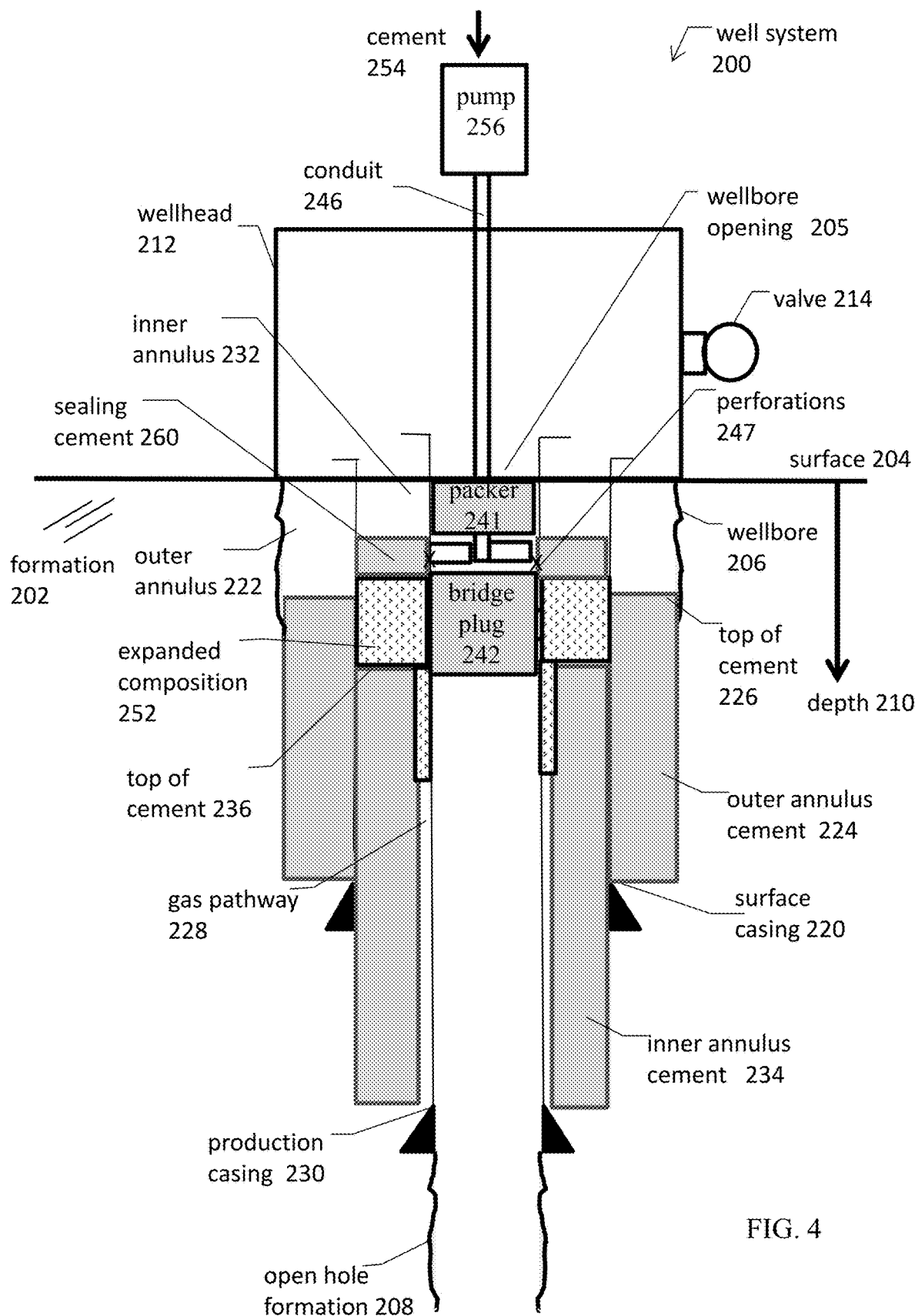
FIG. 4 illustrates a subsequent step of the system and method of FIG. 3 for deploying an expandable composition in a cement top job in accordance with an example embodiment of the disclosure.

Referring to FIGS. 3 and 4, a second example of deploying an expandable composition in a cement top job is illustrated. Many of the components illustrated in FIGS. 3 and 4 are similar or comparable to the components of FIGS. 1 and 2 and, therefore, a detailed description of these similar or comparable components will not be repeated. Similar or comparable components in FIGS. 3 and 4 are denoted by having the same last two digits as the corresponding components in FIGS. 1 and 2.

FIGS. 3 and 4 illustrate a cross-section of an example well system 200, which includes a wellbore 206 that has been drilled into a surface 204 and a formation 202. Well system 200 can be either an onshore or an offshore well. The wellbore 206 includes a wellbore opening 205 in the surface 204 and the wellbore extends a depth 210 into the formation 202 as measured from the surface 204. The wellbore 206 is supported by a surface casing 220, which extends into the wellbore 206 from the wellhead 212 to a first depth, and a production casing 230, which extends into the wellbore 206 from the wellhead 212 to a second depth that is deeper than the first depth. The surface casing 220 and production casing 230 are cylindrical steel tubulars that support the walls of the wellbore as is known by those in the field. Only the two casings are illustrated in FIGS. 3 and 4 for simplicity, but in other embodiments, other casings, such as intermediate casings, may be present in the wellbore 206. The region below the production casing 230 is the open hole formation 208 where the walls of the wellbore 206 are exposed.

The wall of the wellbore 206 and the outer surface of the surface casing 220 form an outer annulus 222 and the inner surface of the surface casing 220 and the outer surface of the production casing 230 form an inner annulus 232. In connection with the drilling of the well, the outer annulus 222 is filled with an outer annulus cement 224 and the inner annulus 232 is filled with an inner annulus cement 234. The top surface of the outer annulus cement 224 is referred to as the top of cement 226 and the top surface of the inner annulus cement is similarly referred to as the top of cement 236.

FIGS. 3 and 4 illustrate an example gas pathway 228 that has formed in the inner annulus 232 and between the outer surface of the production casing 230 and the inner surface of the inner annulus cement 234. The gas pathway 228 may extend around the entire circumference of the annulus or only a portion of the annulus.

Pressure resulting from gas migration upward through the gas pathway 228 in the annulus can be detected at a valve 214 attached to the wellhead 212 and is one example of evidence of gas migration. A cement top job can be performed when gas migration is detected at the valve 214. Alternatively, evidence of gas migration can include preventative situations where a cement top job is performed before an actual casing pressure due to gas migration is detected, but where the integrity of the annulus cement is in question. As described in connection with FIGS. 1 and 2, a variety of verification methods can be used to assess the integrity of the annulus cement and particularly the integrity and location of the top of cement of the annulus cement.

When evidence of gas migration (actual or potential gas migration) through a gas pathway is identified, a cement top job can be performed to seal the gas pathway in order to control the gas migration from the deeper portions of the well up through the annulus. The cement top job illustrated in FIGS. 3 and 4 first involves creating one or more new perforations to connect the wellbore with the annulus above the top of cement. The example illustrated in FIGS. 3 and 4 shows new perforations 243 formed in the production casing 230, thereby providing a pathway from a central portion of the wellbore to the inner annulus 232. The treatment then involves deploying an expandable composition 250 from the mixer 240, through a lower conduit extending downward from the mixer, through the perforations 243, and onto the top of cement 236 wherein an actual or potential gas migration is identified. Optionally, to assist with directing the expandable composition 250 through the perforations 243, a bridge plug 242 can be placed below the perforations 243 and a packer 241 above the perforations 243 as illustrated in FIG. 3. The packer 241 is arranged so that the lower conduit extending downward from the bottom of the mixer passes through the packer 241 to reach the perforations 243. In the example of FIGS. 3 and 4, the expandable composition 250 is deployed around the entire circumference of the inner annulus 232 and thus the expandable composition can be seen on both sides of the inner annulus 232 in the cross-sectional view of FIGS. 3 and 4. Alternatively, the expandable composition can be deployed in a more targeted manner in which it is placed in only a portion of the annulus.

As described in the previous examples of expandable compositions, the expandable composition typically comprises a first component and a second component that are combined to become the expandable composition and such expandable composition will then react and expand to become an expanded composition. The first component can be the isocyanate and the second component can be the organic polyol. Alternatively, the first component can be the slurry of sodium bentonite grains and the second component can be an aqueous liquid. In yet another alternative, the first component can be a superabsorbent polymer and the second component can be an aqueous liquid. As also described in the previous examples, the two components will typically be combined in proximity to the target top of cement location so that they can be deployed before forming into a cured or hardened state of the expanded composition. The two components can be combined external to the wellbore or, as illustrated in FIGS. 3 and 4, they can be combined inside the wellbore and proximate to the top of cement 236 of the inner annulus cement 234.

As illustrated in FIGS. 3 and 4, the first component 242 flows through a conduit 246 to a mixer 240 and the second component 244 flows through another conduit 246 to the mixer 240. Although not shown in FIG. 3, pumps can be used to drive the first component 242 and the second component 244 to the mixer and into the wellbore. The two components are combined in the mixer to form the expandable composition 250. The expandable composition flows from the mixer 240 through the lower conduit below the mixer and through the perforations 243 in the production casing 230. After passing through the perforations in the production casing 230 the expandable composition flows into the inner annulus 232. As illustrated in FIG. 3, the expandable composition 250 is placed at the top of cement 236 of the inner annulus cement 234 where it is allowed to expand.

FIG. 4 illustrates well system 200 after the expandable composition 250 has expanded and become the expanded composition 252 extending along the circumference of the inner annulus 232. As illustrated in FIG. 4, the expanded composition 252 has expanded upward within the inner annulus 232 and downward into the gas pathway 228. Accordingly, the expanded composition 252 can provide a barrier that seals the inner annulus 232 and effectively controls gas migration through the gas pathway 228 in the inner annulus 232. The volume of the expandable composition 250 that is placed in the annulus can be controlled so that after it expands to form the expanded composition 252, space remains in the inner annulus 232 between the top surface of the expanded composition 252 and the wellbore opening 205. Planning for this remaining space in the inner annulus 232 allows for the option to deploy a sealing cement 260 (secondary cement) on top of the expanded composition 252. As illustrated in FIG. 4, one or more additional perforations 247 can be formed in the production casing 230 at a location above the expanded composition 252. If the optional packer 241 and bridge plug 242 are used for directing the sealing cement, they are placed above and below the additional perforations 247. Cement 254 can be pumped by a pump 256 through conduit 246, passing through packer 241, and through the additional perforations 247 so that a layer of sealing cement 260 is deployed on top of the expanded composition 252. While not required, the sealing cement 260 can further assist with gas migration control.

Example 3

Figure 5:
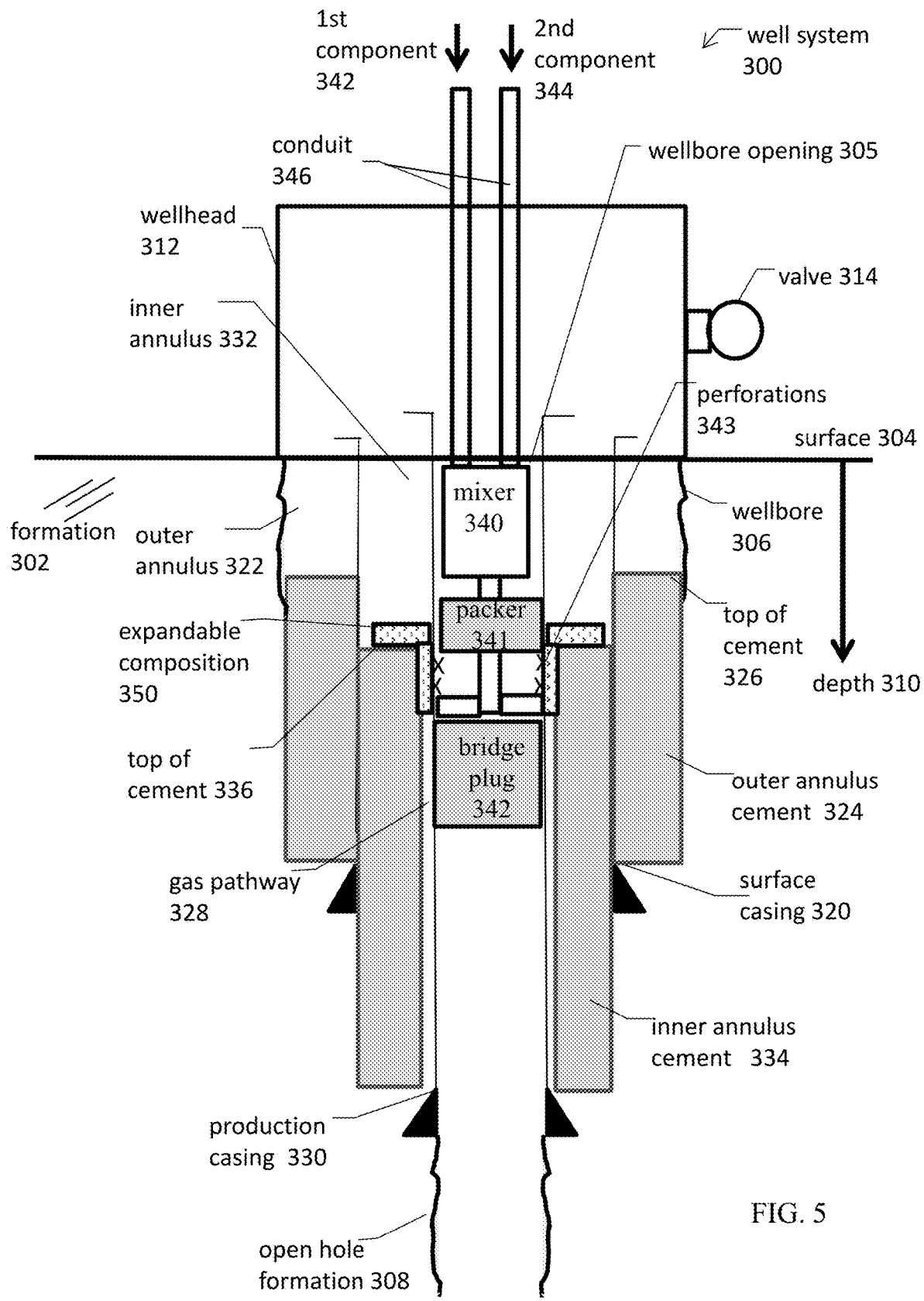
FIG. 5 illustrates yet another system and method of deploying an expandable composition in a cement top job in accordance with an example embodiment of the disclosure.
Figure 6:
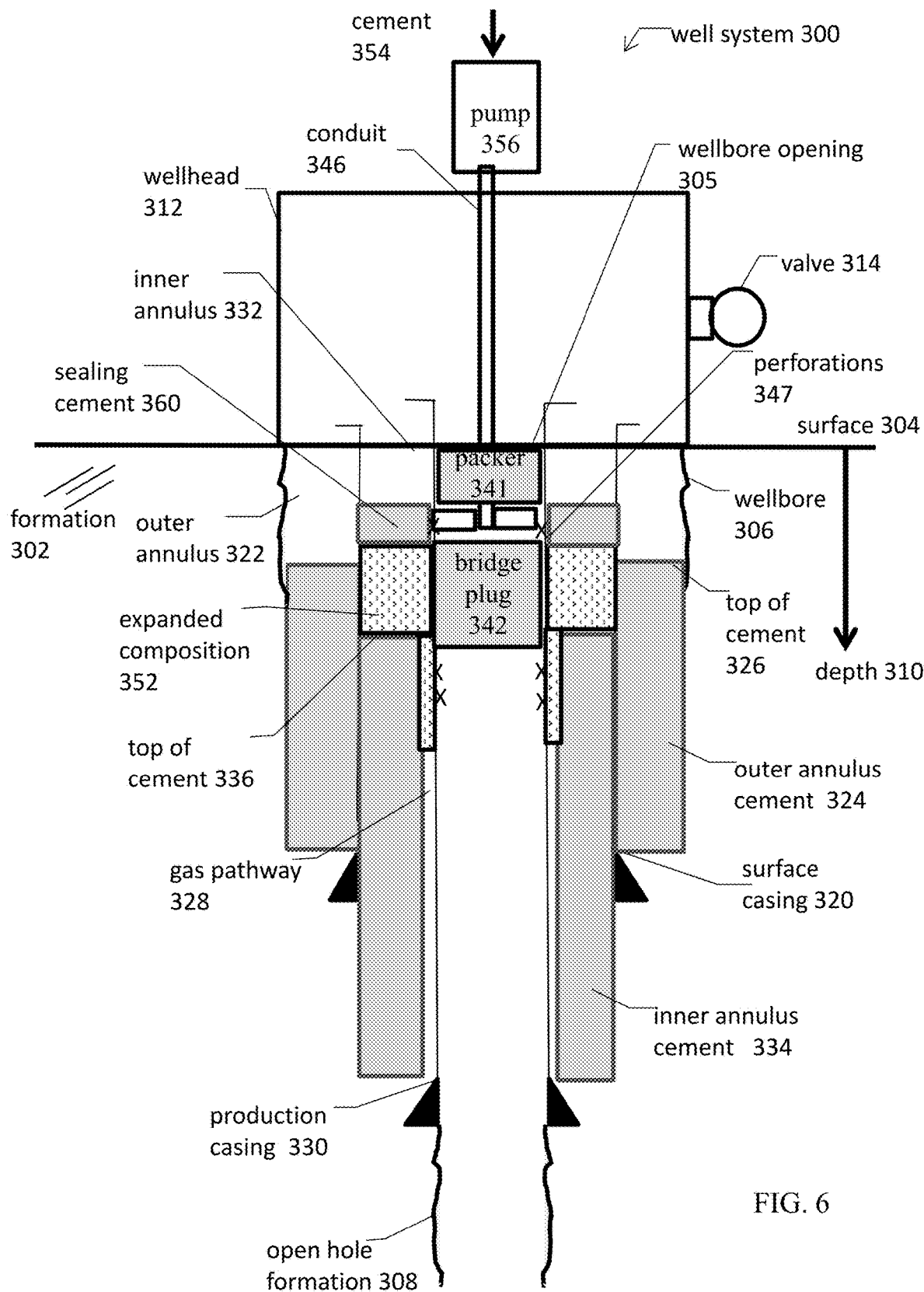
FIG. 6 illustrates a subsequent step of the system and method of FIG. 5 for deploying an expandable composition in a cement top job in accordance with an example embodiment of the disclosure.

Referring to FIGS. 5 and 6, a third example of deploying an expandable composition in a cement top job is illustrated. Many of the components illustrated in FIGS. 5 and 6 are similar or comparable to the components of FIGS. 1 and 2 and, therefore, a detailed description of these similar or comparable components will not be repeated. Similar or comparable components in FIGS. 5 and 6 are denoted by having the same last two digits as the corresponding components in FIGS. 1 and 2.

FIGS. 5 and 6 illustrate a cross-section of an example well system 300, which includes a wellbore 306 that has been drilled into a surface 304 and a formation 302. Well system 300 can be either an onshore or an offshore well. The wellbore 306 includes a wellbore opening 305 in the surface 304 and the wellbore extends a depth 310 into the formation 302 as measured from the surface 304. The wellbore 306 is supported by a surface casing 320, which extends into the wellbore 306 from the wellhead 312 to a first depth, and a production casing 330, which extends into the wellbore 306 from the wellhead 312 to a second depth that is deeper than the first depth. The surface casing 320 and production casing 330 are cylindrical steel tubulars that support the walls of the wellbore as is known by those in the field. Only the two casings are illustrated in FIGS. 5 and 6 for simplicity, but in other embodiments, other casings, such as intermediate casings, may be present in the wellbore 306. The region below the production casing 330 is the open hole formation 308 where the walls of the wellbore 306 are exposed.

The wall of the wellbore 306 and the outer surface of the surface casing 320 form an outer annulus 322 and the inner surface of the surface casing 320 and the outer surface of the production casing 330 form an inner annulus 332. In connection with the drilling of the well, the outer annulus 322 is filled with an outer annulus cement 324 and the inner annulus 332 is filled with an inner annulus cement 334. The top surface of the outer annulus cement 324 is referred to as the top of cement 326 and the top surface of the inner annulus cement is similarly referred to as the top of cement 336.

FIGS. 5 and 6 illustrate an example gas pathway 328 that has formed in the inner annulus 332 and between the outer surface of the production casing 330 and the inner surface of the inner annulus cement 334. The gas pathway 328 may extend around the entire circumference of the annulus or only a portion of the annulus.

Pressure resulting from gas migration upward through the gas pathway 328 in the annulus can be detected at a valve 314 attached to the wellhead 312 and is one example of evidence of gas migration. A cement top job can be performed when gas migration is detected at the valve 314. Alternatively, evidence of gas migration can include preventative situations where a cement top job is performed before an actual casing pressure due to gas migration is detected, but where the integrity of the annulus cement is in question. As described in connection with FIGS. 1 and 2, a variety of verification methods can be used to assess the integrity of the annulus cement and particularly the integrity and location of the top of cement of the annulus cement.

When evidence of gas migration (actual or potential gas migration) through a gas pathway is identified, a cement top job can be performed to seal the gas pathway in order to control the gas migration from the deeper portions of the well up through the annulus. The cement top job illustrated in FIGS. 5 and 6 first involves creating one or more new perforations to connect the wellbore with the annulus above the top of cement. The example illustrated in FIGS. 5 and 6 shows new perforations 343 formed in the production casing 330, thereby providing a pathway from a central portion of the wellbore to the inner annulus 332. The treatment then involves deploying an expandable composition 350 from the mixer 340, through a lower conduit extending downward from the mixer, through the perforations 343, and into a gas pathway 328. In this example, the perforations 343 are formed below the top of cement 336 and the expandable composition 350 flow into the gas pathway 328 and upward onto the top of cement 336. Optionally, to assist with directing the expandable composition 350 through the perforations 343, a bridge plug 342 can be placed below the perforations 343 and a packer 341 above the perforations 343 as illustrated in FIG. 5. The packer 341 is arranged so that the lower conduit extending downward from the bottom of the mixer 340 passes through the packer 341 to reach the perforations 343. In the example of FIGS. 5 and 6, the expandable composition 350 is deployed around the entire circumference of the inner annulus 332 and thus the expandable composition can be seen on both sides of the inner annulus 332 in the cross-sectional view of FIGS. 5 and 6. Alternatively, the expandable composition can be deployed in a more targeted manner in which it is placed in only a portion of the annulus.

As described in the previous examples of expandable compositions, the expandable composition typically comprises a first component and a second component that are combined to become the expandable composition and such expandable composition will then react and expand to become an expanded composition. The first component can be the isocyanate and the second component can be the organic polyol. Alternatively, the first component can be the slurry of sodium bentonite grains and the second component can be an aqueous liquid. In yet another alternative, the first component can be a superabsorbent polymer and the second component can be an aqueous liquid. As also described in the previous examples, the two components will typically be combined in proximity to the target top of cement location so that they can be deployed before forming into a cured or hardened state of the expanded composition. The two components can be combined external to the wellbore or, as illustrated in FIGS. 5 and 6, they can be combined inside the wellbore and proximate to the top of cement 336 of the inner annulus cement 334.

As illustrated in FIGS. 5 and 6, the first component 342 flows through a conduit 346 to a mixer 340 and the second component 344 flows through another conduit 346 to the mixer 340. Although not shown in FIG. 5, pumps can be used to drive the first component 342 and the second component 344 to the mixer and into the wellbore. The two components are combined in the mixer to form the expandable composition 350. The expandable composition flows from the mixer 340 through a lower conduit below the mixer and through perforations 343 in the production casing 330. Well system 300 differs from well system 200 in that the perforations in the production casing 330 are located below the top of cement 336. After passing through the perforations 343 in the production casing 330 the expandable composition flows into the inner annulus 332. As illustrated in FIG. 5, the expandable composition 350 flows into the gas pathway 328 due to the position of the perforations and the expandable composition 350 then expands upward and downward.

FIG. 6 illustrates well system 300 after the expandable composition 350 has expanded and become the expanded composition 352 extending along the circumference of the inner annulus 332. As illustrated in FIG. 6, the expanded composition 352 has expanded downward and upward within the gas pathway 328 and the upward expansion has filled the inner annulus 332 immediately above the top of cement 336. Accordingly, the expanded composition 352 can provide a barrier that seals the inner annulus 332 and effectively controls gas migration through the gas pathway 328 in the inner annulus 332. The volume of the expandable composition 350 that is placed in the annulus can be controlled so that after it expands to form the expanded composition 352, space remains in the inner annulus 332 between the top surface of the expanded composition 352 and the wellbore opening 305. Planning for this remaining space in the inner annulus 332 allows for the option to deploy a sealing cement 360 on top of the expanded composition 352. If a sealing cement is to be deployed, additional perforations can be placed in the production casing 330 above the expanded composition 352. As illustrated in FIG. 6, one or more additional perforations 347 can be formed in the production casing 330 at a location above the expanded composition 352. If the optional packer 341 and bridge plug 342 are used for directing the sealing cement, they are placed above and below the additional perforations 347. Cement 354 can be pumped by a pump 356 through conduit 346 so that a layer of sealing cement 360 is directed through the additional perforations 347 and deployed on top of the expanded composition 352. While not required, the sealing cement 360 can further assist with gas migration control.

Although embodiments described herein are made with reference to the examples illustrated in the figures, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

We claim:

1. A method of deploying an expandable composition in a cement top job in a well system that was previously completed, the method comprising:
    identifying evidence of gas migration within an annulus cement located in an annulus of a wellbore of the well system, wherein the annulus cement was previously cured in the annulus to complete the well system;
    combining a first component and a second component of the expandable composition at a mixer and applying mechanical mixing to form the expandable composition, wherein the first component comprises an isocyanate and the second component comprises an organic polyol and wherein at least one of the first and second components comprises an aryl, alkyl, arakyl, or alkoxy substituent having at least two carbon atoms;
    identifying a location of a top of cement of the annulus cement;
    placing a conduit connected to the mixer into the annulus, wherein the conduit terminates at the top of cement of the annulus cement;
    pumping the expandable composition from the mixer through the conduit to the top of cement of the annulus cement; and
    allowing the expandable composition to harden and form a rigid polyurethane foam that seals the annulus above the top of cement of the annulus cement.

2. The method of claim 1, further comprising, after allowing the expandable composition to harden, pumping cement on top of the rigid polyurethane foam that seals the top of cement of the annulus cement.

3. The method of claim 1, further comprising the step of pumping a pre-flush fluid onto the top of cement of the annulus cement prior to pumping the expandable composition.

4. A method of deploying an expandable composition in a cement top job in a well system that was previously completed, the method comprising:
    identifying evidence of gas migration within an annulus cement located in an annulus of a wellbore of the well system, wherein the annulus cement was previously cured in the annulus to complete the well system;
    identifying a location of a top of cement of the annulus cement and forming a perforation in a section of a casing located above the top of cement;
    combining a first component and a second component of the expandable composition at a mixer placed in the wellbore and applying mechanical mixing to form the expandable composition in the wellbore, wherein the first component comprises an isocyanate and the second component comprises an organic polyol and wherein at least one of the first and second components comprises an aryl, alkyl, arakyl, or alkoxy substituent having at least two carbon atoms;
    pumping the expandable composition from the mixer through a conduit and through the perforation in the casing to the top of cement of the annulus cement; and
    allowing the expandable composition to harden and form a rigid polyurethane foam that seals the annulus above the top of cement of the annulus cement.

5. The method of claim 4, further comprising, after allowing the expandable composition to harden, pumping cement through a second perforation in the casing and on top of the rigid polyurethane foam that seals the annulus above the top of cement of the annulus cement.

6. The method of claim 4, further comprising the step of pumping a preflush fluid through the perforations in the casing and onto the top of cement of the annulus cement prior to pumping the expandable composition.

7. The method of claim 4, further comprising placing a bridge plug below the perforation and placing a packer above the perforation, wherein the bridge plug and the packer direct the expandable composition from the conduit through the perforation and to the top of cement of the annulus cement.

8. A method of deploying an expandable composition in a cement top job in a well system that was previously completed, the method comprising:

identifying evidence of gas migration within an annulus cement located in an annulus of a wellbore of the well system, wherein the annulus cement was previously cured in the annulus to complete the well system;

identifying a location of a top of cement of the annulus cement and forming a perforation in a section of a casing located below the top of cement;

combining a first component and a second component of the expandable composition at a mixer placed in the wellbore and applying mechanical mixing to form the expandable composition in the wellbore, wherein the first component comprises an isocyanate and the second component comprises an organic polyol and wherein at least one of the first and second components comprises an aryl, alkyl, arakyl, or alkoxy substituent having at least two carbon atoms;

pumping the expandable composition from a mixer through a conduit and through the perforation in the casing and up to the top of cement of the annulus cement; and allowing the expandable composition to harden and form a rigid polyurethane foam that seals the annulus adjacent to the top of cement of the annulus cement.

9. The method of claim 8, further comprising forming a second perforation in the casing above the top of cement and above the expanded composition and, after allowing the expandable composition to harden, pumping cement through the second perforation in the casing and on top of the rigid polyurethane foam that seals the top of cement of the annulus cement.

10. The method of claim 9, further comprising the step of pumping a pre-flush fluid through the additional perforations in the casing and onto the top of cement of the annulus cement prior to pumping the expandable composition.

11. The method of claim 8, further comprising placing a bridge plug below the perforation and placing a packer above the perforation, wherein the bridge plug and the packer direct the expandable composition from the conduit through the perforation and to the top of cement of the annulus cement.

* * * * *